United States Patent
Colby et al.

(10) Patent No.: US 10,035,313 B2
(45) Date of Patent: Jul. 31, 2018

(54) TIRE REPAIR PATCH

(75) Inventors: E. Bruce Colby, Greenville, SC (US); Cesar Enrique Zarak, Simpsonville, SC (US)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 1080 days.

(21) Appl. No.: 12/744,063

(22) PCT Filed: Nov. 29, 2007

(86) PCT No.: PCT/US2007/085881
§ 371 (c)(1),
(2), (4) Date: May 21, 2010

(87) PCT Pub. No.: WO2009/070165
PCT Pub. Date: Jun. 4, 2009

(65) Prior Publication Data
US 2010/0258229 A1    Oct. 14, 2010

(51) Int. Cl.
*B29C 73/10* (2006.01)
*B29L 30/00* (2006.01)

(52) U.S. Cl.
CPC ........... *B29C 73/10* (2013.01); *B29L 2030/00* (2013.01); *Y10T 152/10882* (2015.01)

(58) Field of Classification Search
CPC ............................. B29C 73/10; B29L 2030/00
USPC .... 156/95, 97, 323, 395, 537; 152/367, 371; 428/41.8, 42.2, 63; 206/582
See application file for complete search history.

(56) References Cited

U.S. PATENT DOCUMENTS

| | | | |
|---|---|---|---|
| 1,591,817 A | 7/1926 | Hawkinson | |
| 2,229,878 A | 1/1941 | Wilson | |
| 2,547,487 A | 4/1951 | Penney | |
| 2,585,635 A | 2/1952 | Dibble | |
| 2,596,179 A | 5/1952 | Seymour | |
| 2,638,955 A * | 5/1953 | Gruber | 152/367 |
| 2,833,327 A | 5/1958 | Boyce | |
| 3,004,580 A * | 10/1961 | Chambers et al. | 152/367 |
| 3,080,907 A | 3/1963 | Barrett | |
| 3,095,342 A | 6/1963 | Kraly | |
| 3,133,586 A | 5/1964 | Wolfe | |

(Continued)

FOREIGN PATENT DOCUMENTS

| | | |
|---|---|---|
| CA | 1335560 | 5/1995 |
| CA | 2354284 | 1/2003 |

(Continued)

OTHER PUBLICATIONS

Machine-generated English language translation of DE 3926946 (Publication date of original document: Jan. 1991).*

(Continued)

*Primary Examiner* — Martin K Rogers
(74) *Attorney, Agent, or Firm* — Hahn Loeser & Parks, LLP; Bret A. Hrivnak

(57) ABSTRACT

Methods and apparatus for applying a repair patch to a damaged portion of a tire, the steps of the method including removably positioning the patch in a repair position overlapping the damaged portion, pulling a tab to remove a protective sheet to uncover at least a portion of the bonding surface while the patch is in contact with the tire, and pressing the uncovered bonding surface into contact with the tire.

13 Claims, 5 Drawing Sheets

(56) References Cited

U.S. PATENT DOCUMENTS

| | | | |
|---|---|---|---|
| 3,143,156 A | | 8/1964 | Fagert et al. |
| 3,160,194 A | | 12/1964 | Barrett |
| 3,190,338 A | | 6/1965 | Wolfe |
| 3,267,981 A | | 8/1966 | Bennies |
| 3,282,319 A | | 11/1966 | Barnett |
| 3,299,936 A | | 1/1967 | Van Den Berg |
| 3,306,332 A | | 2/1967 | Williams et al. |
| 3,332,466 A | | 7/1967 | Wolfe |
| 3,448,784 A | | 6/1969 | Sons, Jr. |
| 3,648,750 A | | 3/1972 | Felden |
| 3,719,218 A | | 3/1973 | Leybourne, III |
| 3,730,247 A | | 5/1973 | White |
| 4,285,382 A | | 8/1981 | DiRocco et al. |
| 4,317,692 A | | 3/1982 | Niconchuk |
| 4,333,508 A | | 6/1982 | DiRocco et al. |
| 4,375,231 A | | 3/1983 | Bubik et al. |
| 4,385,651 A | * | 5/1983 | Arquilla ................ 152/367 |
| 4,399,854 A | | 8/1983 | DiRocco et al. |
| 4,408,649 A | | 10/1983 | Litterini |
| 4,424,088 A | * | 1/1984 | Durif ................... 156/87 |
| 4,434,832 A | | 3/1984 | Koch et al. |
| 4,540,035 A | | 9/1985 | Roberts |
| 4,696,332 A | | 9/1987 | Koch |
| 4,836,930 A | | 6/1989 | Hill |
| 4,923,543 A | | 5/1990 | Koch et al. |
| 5,139,840 A | | 8/1992 | Ferrara |
| 5,247,981 A | | 9/1993 | Benedicto, Jr. et al. |
| 5,335,707 A | | 8/1994 | Sano et al. |
| 5,695,577 A | | 12/1997 | Ferrara |
| 5,713,842 A | * | 2/1998 | Kay .................... 602/57 |
| 5,830,295 A | | 11/1998 | Hobbs et al. |
| 6,026,878 A | | 2/2000 | Zhang et al. |
| 6,386,255 B1 | | 5/2002 | Majumdar et al. |
| 6,426,129 B1 | | 7/2002 | Kalwara et al. |
| 6,438,932 B1 | | 8/2002 | De Vos et al. |
| 7,025,749 B2 | * | 4/2006 | Propp ................. 604/180 |
| 7,027,877 B2 | * | 4/2006 | Dupelle et al. ........... 607/142 |
| 2006/0037507 A1 | * | 2/2006 | Trigg et al. ............. 101/483 |
| 2008/0142137 A1 | | 6/2008 | Scheungraber |
| 2009/0229737 A1 | | 9/2009 | Fujiwara et al. |

FOREIGN PATENT DOCUMENTS

| | | | | |
|---|---|---|---|---|
| CN | 1311835 | | 9/2001 | |
| DE | 1225981 B | | 9/1966 | |
| DE | 1244003 B | | 7/1967 | |
| DE | 1912469 A1 | | 9/1970 | |
| DE | 3515944 A1 | | 11/1986 | |
| DE | 1141552 B | | 1/1991 | |
| DE | 3926946 | * | 1/1991 | ........... B29C 73/10 |
| DE | 29610697 B | | 9/1996 | |
| EP | 0025180 A2 | | 3/1981 | |
| EP | 279901 | | 8/1988 | |
| EP | 0353313 A1 | | 2/1998 | |
| FR | 634317 A | | 2/1928 | |
| FR | 1203408 A | | 1/1960 | |
| FR | 1226595 A | | 7/1960 | |
| FR | 1287560 A | | 3/1962 | |
| GB | 839087 A | | 6/1960 | |
| GB | 1082327 A | | 9/1967 | |
| GB | 1280210 A | | 7/1972 | |
| JP | 63041209 A | | 2/1988 | |
| JP | 0216209 | | 1/1990 | |
| JP | H07-137155 A1 | | 5/1995 | |
| JP | H07-172123 A | | 11/1995 | |
| JP | 8244124 A | | 9/1996 | |
| JP | 2000512230 A | | 9/2000 | |
| JP | 2001-279835 | * | 10/2001 | ........... E04B 1/684 |
| NL | 9302004 A | | 6/1995 | |
| RU | 2176954 C1 | | 12/2001 | |
| SU | 41858 A1 | | 2/1935 | |
| SU | 238143 A1 | | 2/1969 | |
| SU | 1648807 A1 | | 5/1991 | |
| SU | 1708666 A1 | | 1/1992 | |
| WO | 8504619 A1 | | 10/1985 | |
| WO | 0071809 A1 | | 11/2000 | |
| WO | WO 2005/051259 | * | 6/2005 | ........... A61F 13/02 |
| WO | 2006/094775 A1 | | 9/2006 | |

OTHER PUBLICATIONS

Machine generated English language translation of JP 2001-279835 (original document dated Oct. 2001).*
PCT/US2007/085881 International Search Report Form PCT/ISA/210, dated Nov. 29, 2007, 2 pgs.
PCT/US2007/085881 Written Opinion Form PCT/ISA/237, dated May 8, 2008, 4 pgs.
SU 41858 A1—English abstract translation obtained from McElroy Translation on Aug. 10, 2012, 1 page.
SU 238143 A1—English abstract translation obtained from McElroy Translation on Aug. 10, 2012, 1 page.
SU 1648807 A1—English machine translation obtained using Google Translate (http://translate.google.com) on Apr. 9, 2012, 3 pages.
SU 1708666 A1—English abstract translation obtained from McElroy Translation on Aug. 10, 2012, 1 page.
RU 2176954 C1—English abstract obtained from Espacenet (http://worldwide.espacenet.com) on Apr. 9, 2012, 1 page.
JP63041209A—English abstract and machine translation obtained from Espacenet (http://worldwide.espacenet.com) on Jan. 8, 2013, 23 pages.
JP2000512230A—English machine translation obtained from Patent Abstracts of Japan (http://www4.ipdl.inpit.go.jp) on Jan. 8, 2013, 4 pages.
FR6343174A—English machine translation obtained form European Patent Office website (http://translationportal.epo.org) on Jan. 10, 2013.
FR1203408A—English machine translation obtained form European Patent Office website (http://translationportal.epo.org) on Jan. 10, 2013.
DE1141552 B—English machine translation obtained from Google Translate website (http://translate.google.com) on Jan. 11, 2013.
FR1226595A—English machine translation obtained from Espacenet (http://worldwide.espacenet.com) on Jan. 28, 2013, 4 pages.
FR1287560A—English machine translation obtained from Espacenet (http://worldwide.espacenet.com) on Jan. 28, 2013, 4 pages.
DE1244003B—English machine translation obtained from Espacenet (http://worldwide.espacenet.com) on Oct. 15, 2012, 4 pages.
DE3515944A1—English abstract obtained from Espacenet (http://worldwide.espacenet.com) on Jan. 25, 2013, 1 page.
JP-H07-137155-A—English abstract and machine translation obtained from Patent Abstract of Japan (http://www19.ipdl.inpit.go.jp) on Oct. 11, 2012, 5 pages.
NL9302004A—English abstract obtained from Espacenet (http://worldwide.espacenet.com) on Oct. 15, 2012, 1 page.
JP-H07-172123-A—English abstract and machine translation obtained from Patent Abstract of Japan (http://www19.ipdl.inpit.go.jp) on Oct. 11, 2012, 7 pages.
JP8244124A—English abstract obtained from Espacenet (http://worldwide.espacenet.com) on Jan. 8, 2013, 2 pages.
WO2006/094775A1—English abstract and machine translation obtained from Espacenet (http://worldwide.espacenet.com) on Jan. 28, 2013, 5 pages.
"Mechanics of Pneumatic Tires" US Department of Transportation, National Highway Traffic Administration 1981, pp. 130-138.

\* cited by examiner

TIRE REPAIR PATCH

This application is a National Stage application of PCT Application No. PCT/US2007/085881, filed Nov. 29, 2007, to which this application claims priority and the benefit of, the disclosure of which is also hereby incorporated by reference.

BACKGROUND OF THE INVENTION

Field of the Invention

This invention relates generally to tire repair patches, and, more specifically, to tire repair patches having a bonding layer for application to a damaged portion of a tire.

Description of the Related Art

Tires are known to be susceptible to becoming damaged. Such damage may occur when a tire encounters a pothole, a curb or road debris, such as nails, glass or stones, or during tire mounting or dismounting, manufacturing or tire handling. Such damage may occur on the inside or outside of the tire or may extend through the tire, such as a puncture. Damage may occur anywhere along a tire, such as along the belt or sidewall areas.

When repairing the damaged portion of a tire, a patch may be used to cover and seal the damaged portion. A patch may be made from various types of materials, such as, rubber and polymeric materials. The damaged portion may be prepped prior to application of the patch. For example, the area may be cleaned, debris and any damaged material removed, and an adhesive or bonding agent applied. Once applied to the damaged portion, the patch may be adhesively affixed or cured to the tire.

SUMMARY OF THE INVENTION

Particular embodiments of the present invention include methods and apparatus for repairing a damaged portion of a tire. Particular embodiments of the present invention include methods for applying a repair patch to a damaged portion of a tire, the methods having steps that include removably positioning the patch in a repair position overlapping the damaged portion, the patch including a protective layer covering a bonding surface, and the protective layer comprising one or more protective sheets having a fold to form internal and external sheet layers. Other steps may include pulling a tab to remove a protective sheet to uncover at least an initial portion of the bonding surface while the patch is in the repair position, the tab being associated with an external sheet layer of the protective sheet, and pressing the uncovered bonding surface into contact with the tire.

Particular embodiments of the present invention may include a tire repair patch that includes a body having a bonding surface. The patch also includes a protective layer covering the bonding surface, the protective layer comprising one or more protective sheets, each sheet including a fold to provide an internal surface layer covering at least a portion of the bonding surface and an external sheet layer that extends in a direction outward the patch. The patch further includes a tab associated with the external sheet layer, the tab extending beyond an end of the patch body.

The foregoing and other objects, features and advantages of the invention will be apparent from the following more detailed descriptions of particular embodiments of the invention, as illustrated in the accompanying drawing wherein like reference numbers represent like parts of the invention.

DETAILED DESCRIPTION OF PARTICULAR EMBODIMENTS

Figure 1:
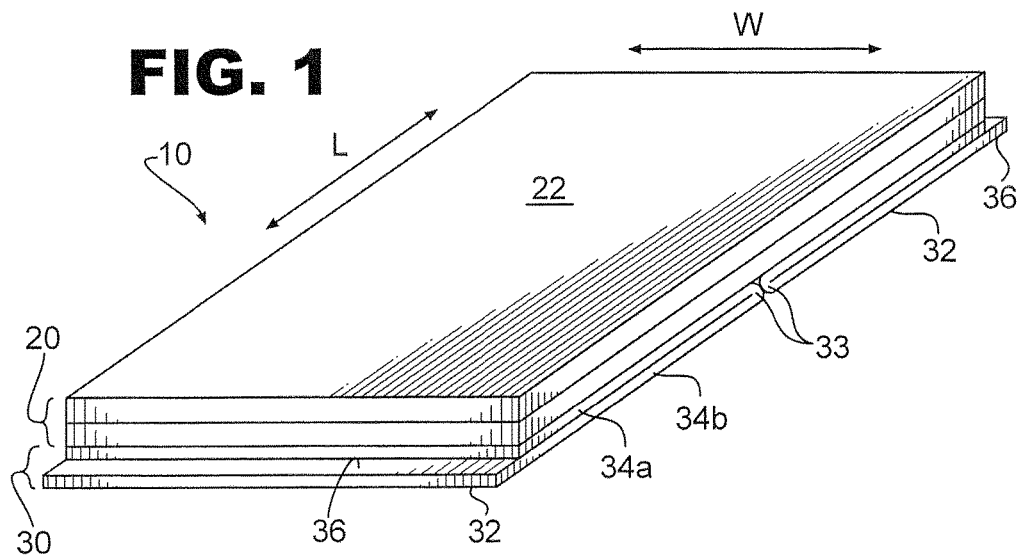
FIG. 1 is a top perspective view of a tire repair patch according to an embodiment of the invention.

Particular embodiments of the present invention provide methods and apparatus for repairing a damaged portion of a tire carcass, such as, for example, a belt or sidewall area.

It is commonly known that tires may become damaged. Damage may occur to the inside or outside of a tire. Further, a tire may become punctured, whereby the damage penetrates through the tire. Any such damage may be attributed to, for example, encountering road debris, tire mounting or dismounting or tire shipping and handling.

When tires are damaged, the damaged portions may be repairable. One method of repairing tires includes applying a repair patch. A repair patch is generally used to cover and seal a damaged portion. A patch may generally include a bonding surface, which may be covered by a protective layer. The bonding surface, for example, may form part of a cured or uncured layer of natural or synthetic rubber or polymeric material, or may comprise an adhesive applied to a surface of the patch. Prior to applying a patch, the damaged portion may be assessed and prepped for patch application. For example, debris and damaged portions of the tire may be removed from the damaged portion. This may include removing one or more layers of material from the tire. The damaged portion may also be cleansed with a solvent or other cleaning agent prior to patch application.

Further, one or more templates may be used to assess the size and extent of the damaged portion, and to isolate or limit the area to be prepped, covered, or otherwise attended to. The template may also be used to determine the size of the repair patch, as the patch size may be associated with the size of each template. In one example, patch sizes are pre-determined, and a template is used to relate the size of the damaged portion to a corresponding standard patch size. In another example, a template may be used to determine the size of the damaged portion, and a patch may be cut or formed to provide a desired patch size for repairing the damaged portion. Prior to patch application, a bonding agent, such as tire cement, may be applied to the damaged portion to promote bonding between the patch and the tire. This bonding agent assists in ultimately generating a substantially permanent bond between the patch and the tire. Any bonding agent may be used, such as those known to one of ordinary skill in that art, which may be selected, when desirous, to be compatible with the bonding layer, the tire, and/or any curing method that may be used to complete the repair process.

When applying the patch to the tire by way of the bonding surface, it may be desirous to apply the patch in a particular orientation or position. Achieving a particular patch orientation to repair the damaged portion (i.e., the "repair position") may be difficult when exposing the bonding surface prior to achieving such orientation. Difficulty may arise due to the initial adhesion or bond that forms when a bonding surface contacts the tire, which may make any re-alignment or removal of the patch difficult without damaging the patch and/or the tire. For example, when attempting to accurately position a patch over top a damaged tire portion, the patch may unintentionally contact and prematurely adhere to the tire before the patch is properly oriented into a repair position. In another example, undesired air may become trapped between the patch and the tire if the bonding surface unintentionally contacts the tire in spaced apart locations to cause a gap between the patch and the tire (i.e., the patch bridges the tire surface). This bridging generally traps air in the gap, which may not be fully removable. Bridging may become more likely when attempting to repair curved surfaces that commonly existing along a tire, as it may be easier to bridge a curved surface. Therefore, it may be desirous to first position the patch into a repair position over the damaged portion before preparing the patch for application to the tire.

To aid in describing the various embodiments of the invention, the repair patch is defined to have a length and a width, regardless of the shape of the patch. The lengthwise direction refers to the direction, along the patch, in which a protective sheet or fold travels when being removed by way of an associated tab. Therefore, the fold of each such sheet extends in a direction across the width of the patch. With reference to FIG. 1, a length or lengthwise direction of the patch and its components is referred to as L, while a width or widthwise direction of the patch and its components is referred to as W.

Particular embodiments of the present invention include methods of applying a repair patch to a damaged portion of a tire. Particular embodiments of such methods may include the step of removably positioning the patch in a repair position overlapping the damaged portion, the patch including a protective layer substantially covering a bonding surface, and the protective layer comprising one or more protective sheets having a fold to form internal and external sheet layers. It is recognized that the bonding surface of a tire patch may substantially adhere or bond to the tire when placed in contact there with, making it difficult to re-align or re-position the patch into a repair position without damaging the tire or the patch. It follows that the patch may include a protective layer that generally covers the patch bonding surface, thereby maintaining the bonding properties of the surface and isolating the bonding surface to prevent premature contact with the tire or any other object. Accordingly, a user may adjustably position the patch into a repair position overlapping (i.e., on top of, in contact with) the damaged tire portion. In positioning the patch, a user may now slide, lift, or otherwise translate the patch relative to the tire while in contact therewith. In an exemplary embodiment, the patch repair position may orient the patch to extend lengthwise in a radial direction across the tire, that is, in a direction substantially perpendicular to the planes containing each of the tire beads. It is contemplated, however, that the repair position may orient the patch to extend lengthwise in any other direction between, and including, a circumferential (longitudinal) direction and the radial direction of the tire.

Figure 2:
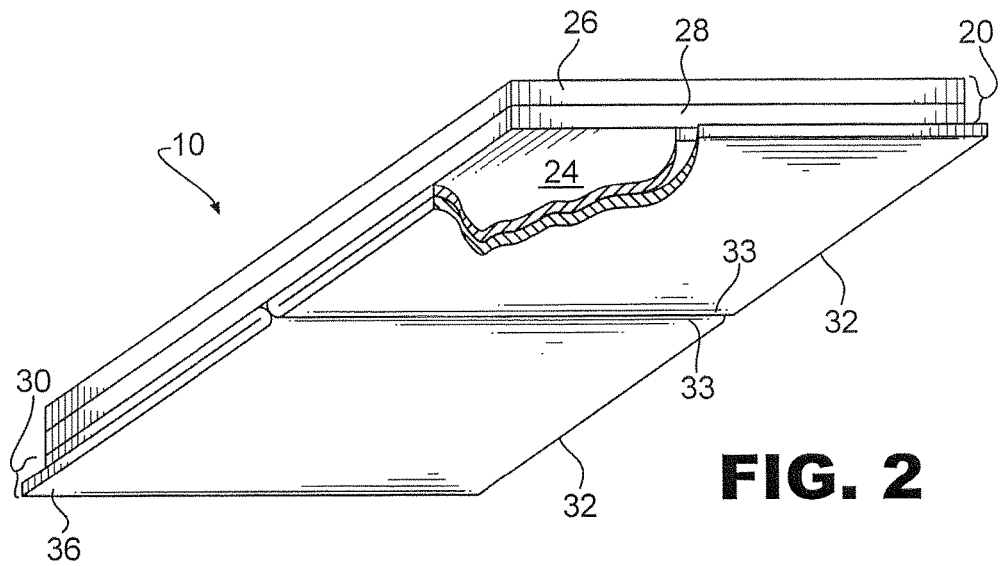
FIG. 2 is a bottom perspective view of the tire repair patch shown in FIG. 1.

The protective layer may comprise one or more folded protective sheets, the folds forming an internal sheet layer and an external sheet layer. The internal sheet layer may contact the patch bonding surface, while the external sheet layer extends from the fold in a direction lead over the internal layer and towards an outward edge of the patch. In an exemplary embodiment of a patch for use with this method, as shown in FIGS. 1-2, a patch 10 includes a protective layer 20 covering a bonding surface 24, the protective layer including sheets 32 having a fold 33 to form internal layer 34a and external layer 34b. The exemplary patch 10 is discussed in further detail below.

Figure 5:
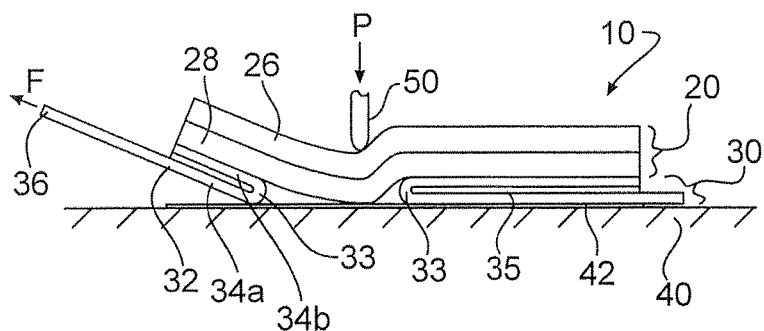
FIG. 5 is a side view of the patch shown in FIG. 4, wherein one of the patch's protective sheets is being removed in accordance with an embodiment of the invention.
Figure 6:
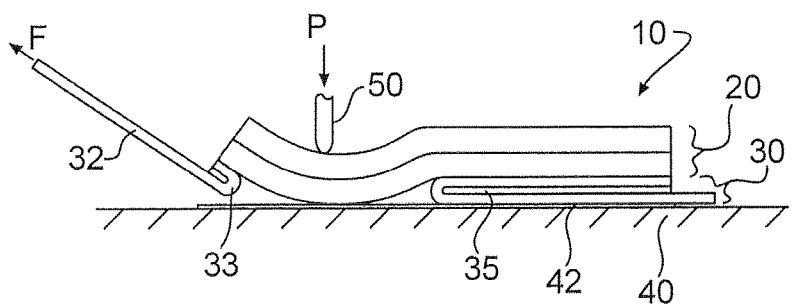
FIG. 6 is a side view of the patch shown in FIG. 5, wherein one of the patch's protective sheets is almost removed in accordance with an embodiment of the invention.
Figure 7:
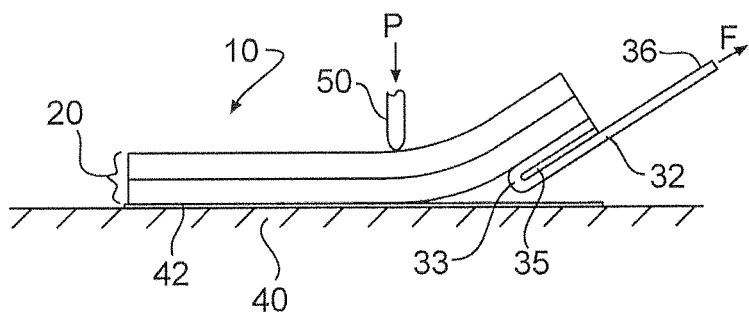
FIG. 7 is a side view of the patch shown in FIG. 6, wherein a second protective sheet is being removed in accordance with an embodiment of the invention.

The methods may further include the step of pulling a tab to remove a protective sheet to uncover at least a portion of the bonding surface while the patch is in contact with the tire in the repair position, the tab being associated with an external sheet layer of the protective sheet. Once it is determined that the repair patch is in a repair position, that is, the position desired to repair the damaged tire portion, the patch may then be secured to the tire. Before securing the patch to the tire, at least a portion of the protective layer is removed to expose or uncover at least a portion of the bonding surface, while generally maintaining the patch in contact with the tire, and generally in the repair position. Sheet removal may be achieved by pulling a tab associated with the protective sheet. Generally, a tab is associated with the external sheet layer of a protective sheet, such that when the tab is pulled, the fold moves toward the associated tab and causes the internal sheet layer to separate from the bonding layer. In generally maintaining the patch in the repair position, a portion of the patch may be lifted to access a tab, or may be lifted due to the forces exerted on the tab when removing a protective sheet. It is contemplated that the tab may comprise, or form part of, the external layer, or the tab may be attached operably to the external layer. It is contemplated that a single tab may be associated with one or more sheets, and that a tab may extend from an end of the patch for easy access, or may remain under or within the outer edges of the patch. In the exemplary embodiment of a patch shown in FIGS. 1-2, the exemplary patch 10 includes tabs 36 that are associated with external layer 34*b*, wherein the tabs 36 form a portion of external layer 34*b*. FIGS. 5-6, in an exemplary embodiment, generally describe the step of pressing, in accordance with the methods described herein. A more detailed explanation follows below.

The methods may further include the step of pressing the uncovered bonding surface into contact with the tire. Pressing the uncovered bonding surface into contact with the tire facilitates bonding between the tire and the patch. Particular embodiments may include performing the step of pulling after performing the step of removably positioning the patch in a repair position. Particular embodiments may also include, as part of the step of pressing, performing the step of pressing during the step of pulling, wherein the uncovered bonding surface is pressed against the tire as the bonding surface is uncovered by way of the step of pulling. Particular embodiments, as part of the step of pressing, may also include performing the step of pressing occurs during the step of pulling, wherein the uncovered bonding surface is pressed into contact with the tire near the fold and continues to be pressed near the fold as the fold translates across the patch during removal of the protective sheet. Pressing the uncovered bonding surface into contact with the tire as it is being uncovered may be beneficial for minimizing the amount of air that may become trapped between the patch and the tire. By pressing the bonding surface into contact with the tire with the moving fold as it exposes the bonding surface, any bridging between the bonding surface and the tire is reduced if not substantially eliminated. These embodiments attempt to limit or prevent any bridging of air between the patch and tire. It is contemplated that the bonding surface may be pressed by hand, roller, or stitcher, or any other means known to one of ordinary skill in the art.

Figure 8:
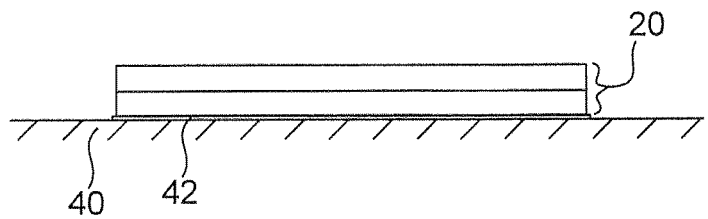
FIG. 8 is a side view of the patch shown in FIG. 7, wherein the second protective sheet is removed and the bonding surface of the patch fully engaged with the tire, in accordance with an embodiment of the invention.

The particular embodiments of the step of pressing and the step of pulling are generally shown in FIGS. 4-8, in an exemplary embodiment. In the figures, FIG. 4 generally shows an exemplary patch 10 positioned in a repair position. In accordance with the step of pulling, FIG. 5 shows a tab 36 being pulled by way of force F to begin removal of a sheet 32. In accordance with the step of pressing, a force P is being applied by mechanism 50 to press bonding surface 24 against the tire 40. Mechanism 50 may comprise any known means of applying pressure or force, as described in above, which may include a hand, roller, or stitcher. In the exemplary embodiment, FIG. 6 shows the bonding surface 24 being pressed into contact with tire 40 as sheet 32 is being removed. The methods described herein may further include the step of repeating the steps of pulling and pressing until the protective layer is substantially removed from the patch. With reference to the exemplary embodiment shown in FIG. 7, once the first sheet 32 has been removed, a second sheet 32 may then be removed and pressed into contact with tire 40 according to particular embodiments of the methods described herein. After the second sheet 32 has been removed, in this exemplary embodiment, the patch 10 is in full contact with tire 40 to facilitate repair of the damaged portion as shown in FIG. 8. It should be noted that the step of repeating may not be necessary to fully expose the bonding surface, as a patch 10 may only include one sheet 32 that extends across the length of the patch, whereby the fold generally travels from one end to the other when removing the sheet 32.

Figure 9:
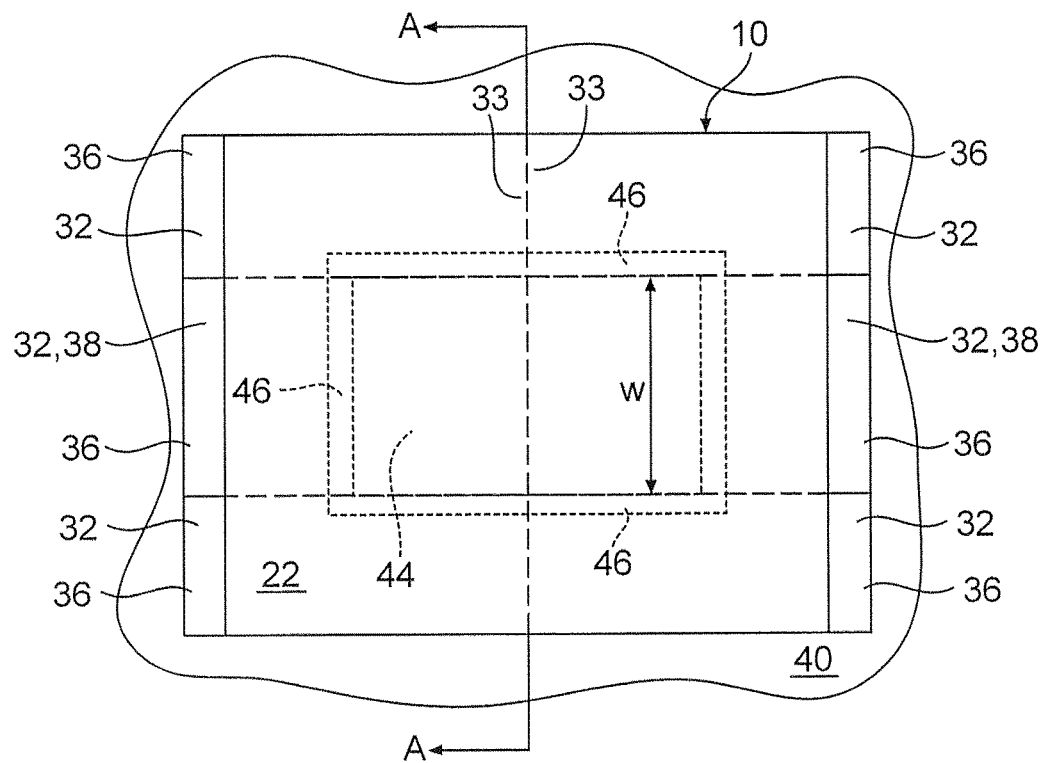
FIG. 9 is a top view of a tire patch covering a damaged portion having a depressed area, in accordance with an embodiment of the invention.
Figure 10:
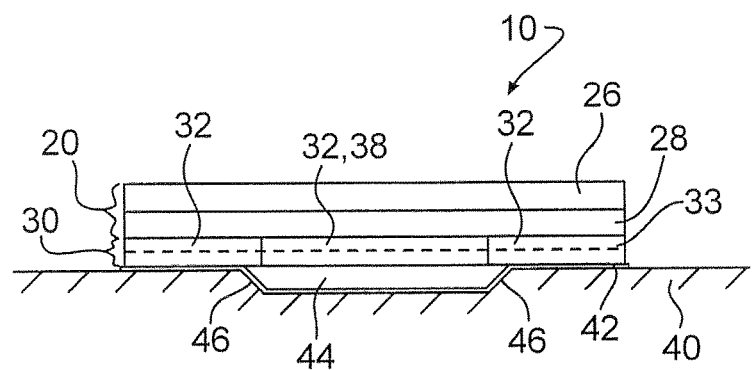
FIG. 10 is a cross-section view of Section A-A of FIG. 9, showing the patch prior to removal of any protective sheet, in accordance with an embodiment of the invention.
Figure 11:
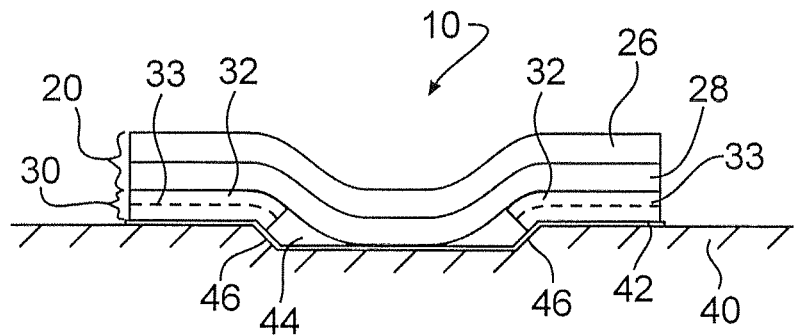
FIG. 11 is an end view of the patch shown in FIG. 10, wherein the central sections of the protective layer have been removed to place the central portions of the bonding surface in contact with the tire in accordance with an embodiment of the invention.
Figure 12:
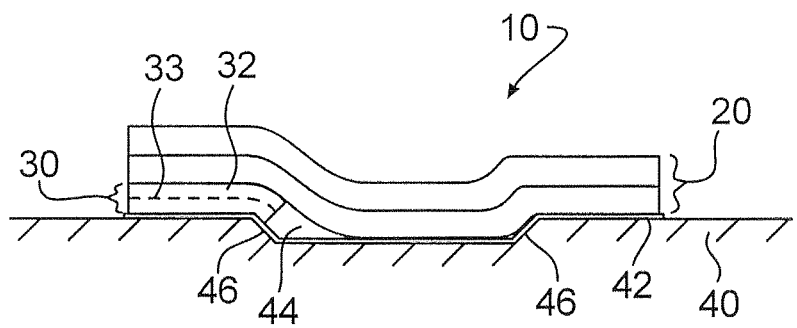
FIG. 12 is an end view of the patch shown in FIG. 10, wherein a pair of side sections of the protective layer has been removed to place the corresponding portions of the bonding surface in contact with the tire.
Figure 13:
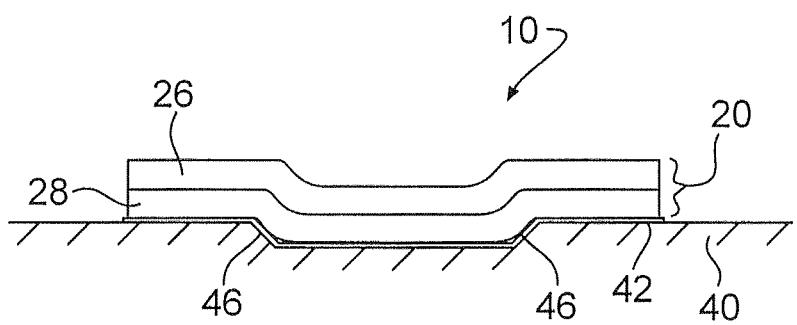
FIG. 13 is an end view of the patch shown in FIG. 10, wherein the remaining pair of side sections of the protective layer has been removed to place the remaining portions of the bonding surface in contact with the tire.

In particular embodiments, a patch may include one or more depression sheets, the depression sheets being protective sheets sized to fit across at least a portion of a depressed area in the damaged tire portion. In one embodiment, each depression sheet has a width, such that one or more depression sheets have a collective width that approximates a width of the depressed area. Particular embodiments of the methods described herein may include, as part of the steps of pulling and pressing, removing the one or more depression sheets and pressing the corresponding bonding surface portions in accordance with the steps of pulling and pressing before removing any other of the one or more protective sheets in accordance with the step of pulling. In an exemplary embodiment, FIGS. 9-13 show certain completed steps in applying an exemplary patch 10 to a depressed area 44, in accordance with the methods described herein. The exemplary patch shown in FIG. 9 is overlying an exemplary depressed area 44. A cross-section view of FIG. 9 is shown in FIG. 10. FIG. 11 shows the depressed sheet 38 removed before the other non-depressed, protective sheets 32 are removed. This allows air to escape the depressed area 44 during the application of the bonding surface associated with depressed sheet 38. Also in this exemplary embodiment, depression sheet 38 is generally the width w of depressed area 44. If, however, depressed sheet 38 were wider than the width w of depressed area 44, or if the adjacent protective sheets 32 were applied before applying to the depressed sheet bonding surface as shown, the likelihood of trapping air in depressed area 44 may increase. In other embodiments, it is contemplated that more than one depression sheet 38 may be used to achieve the approximate width of depression area 44. Depression area 44 may be surrounded or circumscribed by a beveled side surface 46, and in one embodiment, the one or more depression sheets 38 fit within the width w of depressed area 44 without extending over any beveled side surface 46.

It is also understood that providing multiple sheets across the width of patch 10 may be beneficial in non-depressed area applications. For example, applying a patch to a curved surface may be difficult, especially when trying to avoid any bridging of patch across the curved surface. Therefore, by providing narrower protective sheets 32, the risk of bridging may be reduced as a narrower sheet 32 may span less curvature.

In the steps of pulling and pressing, the patch may be manipulated to slightly deviate from its repair position, but this is because, for example, the initial alignment may not have been as accurate as initially believed, and/or because the patch material and/or tire is elastic and deformable. One goal may be to initially place the patch on the damaged tire portion, and subsequently to move and align the patch about the damaged portion as necessary to align the patch in a general repair position. During the steps of pulling and pressing, for example, the elasticity of the patch and/or the deformation of the tire may cause the patch to deviate from the initial repair position, or it may be learned that slight adjustments may be desired as the patch is pressed into contact with the damaged tire portion.

The methods described herein are used to apply a tire patch to damaged tire portion. Exemplary embodiments of a tire patch for use in such methods are discussed in further detail below.

A tire patch 10 for use in the methods described herein is generally shown in FIGS. 1-2, and may include a body 20 and a protective layer 30. Patch 10 may comprise any desired shape, such as a rectangle, square, circle, or oval. Patch 10 may also comprise any desired size. It is contemplated that the damaged area may be prepped to meet the size and shape of a tire patch 10, or the patch 10 may be cut or otherwise formed to the size and shape as desired to repair damaged portion. It is also contemplated that patch 10 may be arranged in any fashion relative to tire 40. In one embodiment, patch 10 is arranged relative to tire 40 so that patch 10 extends in a lengthwise direction radially (laterally) between the beads of tire 40 (i.e., in a direction that is perpendicular to a plane containing one of the tire beads). It is contemplated that patch 10 may be aligned in any other orientation, such as lengthwise in a circumferential (longitudinal) direction, or any angular direction between radial and circumferential directions. It may be desirous to arrange patch 10 at an angle relative to the radial and circumferential directions to orientate any reinforcing fabric within patch 10 with respect to one or more reinforcing fabrics or materials within tire 40.

Body 20 generally provides the structure for repairing the damaged portion. The formation and construction of body 20 is generally well known to one having ordinary skill in the art. The protective layer 30 generally covers a bonding surface 24 of body 20, and may prevent any degradation or unintended application of bonding surface 24. As shown in FIGS. 1-2, an exemplary embodiment of body 20 includes a top surface 22, and bonding surface 24 located along a bonding layer 28. With regard to top surface 22, a pressing force may be applied thereto by a mechanism 50 to achieve the various embodiments of the pressing step of the methods described herein, and as shown in an exemplary embodiment in FIGS. 5-7.

It is understood that body 20 may be formed from one or more layers of material. Such material may comprise any desired material, such as, without limitation, cured or uncured rubber or polymeric material, which includes styrene butadiene rubber (SBR). Further, each such material, and therefore each layer, may be reinforced with various substances, such as, without limitation, nylon, aramid, or polyester fabric. Therefore, each body layer, including the bonding layer 24, may be a reinforced layer. In the exemplary embodiment shown in the figures, body 20 includes a reinforced layer 26 in addition to a bonding layer 28. In this embodiment, bonding surface 24 generally comprises a surface of bonding layer 28. However, it is contemplated, in other embodiments, that bonding surface 24 may instead comprise an adhesive or bonding agent applied to a surface of bonding layer 28.

Figure 3:
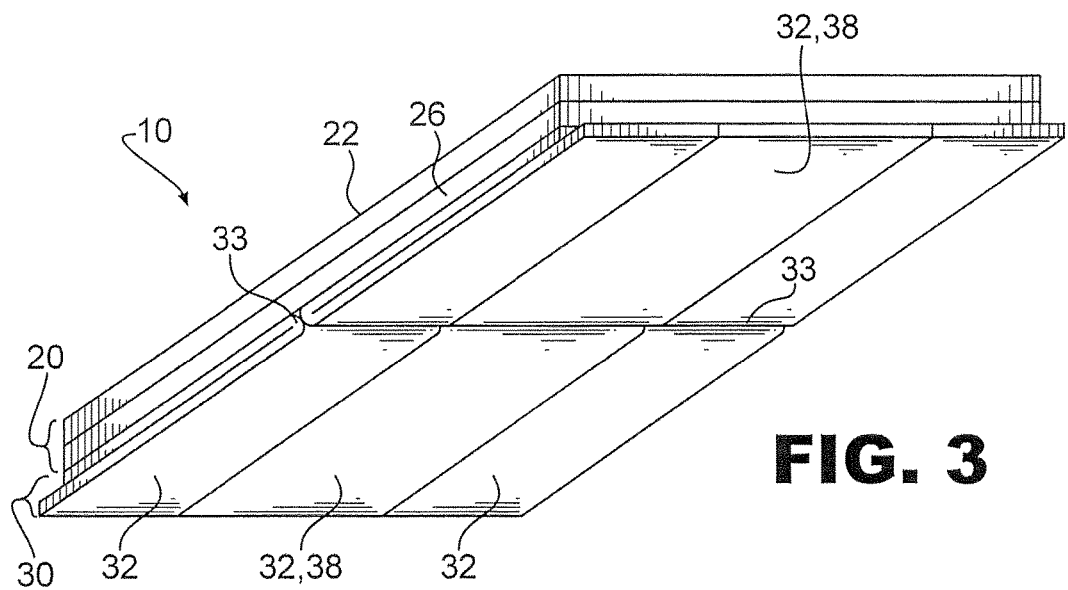
FIG. 3 is a bottom perspective view of another embodiment of a tire repair patch according to an embodiment of the invention.
Figure 4:
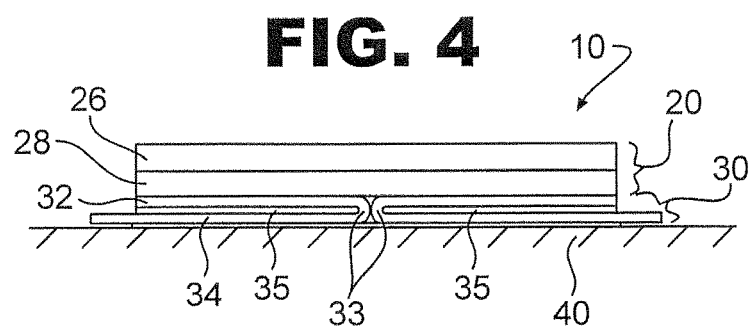
FIG. 4 is a side view of an embodiment of the tire repair patch shown in FIG. 1, the patch located atop a damaged portion of a tire.

Protective layer 30 generally comprises one or more sheets 32. If multiple sheets are provided across the width of patch 10, for example, as shown in FIG. 3, each sheet 32 may be individually placed or arranged upon patch 10, or each sheet 32 may be partitioned or cut from a larger sheet 32. Each sheet 32 may be made of a material, or coated with a material that does not permanently bond or adhere with bonding surface 24 or any bonding agent 42 located on tire 40, as sheet 32 is to be reasonably capable of being removed from bonding layer 24 and a tire surface coated with a bonding agent. Accordingly, it is contemplated, without limitation that each sheet 32 may be made of polyesters or plastics, which include, without limitation, oil-free and silicone-free plastics.

Each sheet 32 generally includes a fold 33, thereby arranging or transforming each sheet 32 into an internal sheet layer 34a and an external sheet layer 34b. A fold 33 may be located or oriented as desired across patch 10. In the exemplary embodiment shown in the figures, opposing folds 33 are located centrally along the length of patch 10, and extend across the width in abutting relation. It is contemplated that one fold 33 may exist, such as when only one sheet 32 exists.

Internal layer 34a generally engages bonding surface 24, while external layer 34b generally extends from fold 33 in toward an outward edge of body 20. External layer 34b may, or may not, extend beyond an external edge of body 20, and may, or may not, consist of a tab 36. In the exemplary embodiments shown in the figures, external layer 34b extends beyond the external limits or edges of body 20 and therefore is externally exposed to form a tab 36. As shown in FIGS. 4-8, in an exemplary embodiment, a non-permanent adhesive 35 may be placed between the internal and external layers 34a, 34b to maintain the folded orientation of each sheet 32. Any such adhesive known to one having ordinary skill in the art may be used to accomplish the stated purpose.

A tab 36 may exist for a user to grasp and pull a sheet 32 for removal thereof. Tab 36 may comprise an end of the external layer 34b, or may be a separate form operably attached to external layer 34b. Tab 36 may also extend outwardly from body 20, as shown in the figures, to provide easy access to the tab 36. This may be especially helpful in maintaining the patch 10 in a repair position in performing the methods described herein, as an external tab 36, as shown in the figures, may allow a user to avoid any lifting of patch 10 after it has been placed in a desired repair position, which helps avoid any subsequent movement or deviation of patch 10 from its repair position. However, it is contemplated that tab 36 may remain within the bounds of body 20, and therefore, remain along the underside of patch 10 when in a repair position. In such an orientation, a user would first have to lift a side of patch 10 to access tab 36 prior to removing a sheet 32, in accordance with the methods described herein.

As shown in FIGS. 9-13, it is contemplated that a patch 10 may be used to repair a damaged tire portion having a depressed area 44. It has been discussed that area 44 may be formed by removing one or more layers of material from tire 40, or by other damage or defects associated with tire 40. A layer may be removed, for example, when the layer itself is damaged, or if removal of the layer provides access to a damaged area. In an exemplary embodiment, an innerliner layer, may be removed from a tire prior to patch application.

In one exemplary embodiment, such as shown in FIGS. 3 and 9-13, a protective layer 30 may include one or more depression sheets 38. Each depression sheet 38 may be a protective sheet 32 that has a width designed to approximate the width w of depressed area 44, or is to be combined with other depressed sheets 38 to collectively approximate the width w of depressed area 44. This may avoid the situation where a patch 10 contains a protective sheet 32 that is wider than a depressed area 44, where the application of the corresponding bonding surface 24 may bridge area 44 and trap air therein. To also aid in the removal of air from depressed area 44, the edges of area 44 may be buffed, ground, or otherwise shaped to form a beveled or smooth edge 46 that provides a more gradual transition from area 44 to an outer surface of tire 40.

When repairing damaged tire portions, there may be a concern that air may permeate through the damaged portion. In such a situation, it may be desirous to provide a patch that is larger than the damaged area, or at least the portion thereof through which air may permeate. Such a situation may arise when repairing a puncture, as air may permeate outwardly through the puncture. In another exemplary embodiment, air may permeate through a damaged portion, such as where a layer of tire is removed. In such an embodiment, the layer may be an innerliner layer, which is generally an external layer of the tire, generally located along the pressurized or internal side of the tire, which may protect the tire by preventing any permeation of air through the tire construction. For example, the innerliner may be formed of butyl and may extend around the tire sidewall and bead areas. Therefore, when attempting to repair an area where a layer of material has been removed (i.e., an depressed area 44), it may be desirous to provide a patch 10 having three or more protective sheets positioned across the patch's width, which is exemplarily shown in FIGS. 3, and 9-13. This provides body material on either side of the depression sheet 38 to overlap the edges of depressed area 44, which better seals area 44 and prevents any permeation or leakage of air about the perimeter of area 44.

While this invention has been described with reference to particular embodiments thereof, it shall be understood that such description is by way of illustration and not by way of limitation. Accordingly, the scope and content of the invention are to be defined only by the terms of the appended claims.

What is claimed is:

1. A method for applying a repair patch to a damaged portion of a tire, the method comprising:

removably positioning the repair patch in a repair position overlapping the damaged portion, the damaged portion including a depressed area and the repair patch including a body and a protective layer having a plurality of protective sheets covering a bonding surface, the plurality of protective sheets each having a fold arranging each of the plurality of protective sheets into an internal sheet layer engaging the bonding surface and an external sheet layer extending along a direction of patch length from the fold to an edge of the repair patch opposite the fold, each external sheet layer forming a tab that by pulling uncovers an associated portion of the bonding surface covered by each connected internal sheet layer within the repair position, the plurality of protective sheets comprising one or more depression sheets having one or more depression sheet widths associated with each of the one or more depression sheets, where a sum of the one or more depression sheet widths is approximately equal to a depressed area width of the depressed area within the damaged tire portion;

pulling a first tab and translating a first fold, thereby uncovering the associated portion of the bonding surface, the first tab is the tab associated with one of the plurality of protective sheets; and pressing the associated portion of the bonding surface into contact with the damaged portion during translating of the first fold, removing air between the repair patch and the damaged portion and preventing bridging of the repair patch.

2. The method of claim 1, wherein pressing the associated portion of the bonding surface occurs near the first fold during the step of pulling the first tab associated with the one of the plurality of the protective sheets, and the associated portion of the bonding surface continues to be pressed near the first fold as the first fold translates during removal of the one of the plurality of protective sheets.

3. The method of claim 1, further comprising:

repeating the pulling and pressing on more than one of the plurality of protective sheets until the protective layer is substantially removed from the repair patch.

4. The method of claim 1, further comprising extending each tab outwardly beyond a periphery of the repair patch during pulling of each tab.

5. The method of claim 1, wherein the damaged portion is precoated with a bonding agent prior to placing the repair patch in the repair position.

6. The method of claim 4, wherein the bonding surface forms a portion of a bonding layer of the repair patch and is formed of uncured rubber or polymeric material.

7. The method of claim 1, wherein the depressed area width is bounded by a pair of beveled side surfaces, such that the sum of the one or more depression sheet widths fits within the width of the depressed area without extending over either of the pair of beveled side surfaces.

8. The method of claim 1, wherein the one or more depression sheets are removed and depression portions of the bonding surface previously covered by the one or more depression sheets are pressed into contact with the tire before any other of the plurality of protective sheets are removed in accordance with the steps of pulling and pressing, and wherein the other of the plurality of protective sheets are subsequently removed and a subsequent portion of the bonding surface is then pressed into contact with the tire adjacent the depressed area.

9. The method of claim 7, wherein the one or more depression sheets are a first of the plurality of protective sheets removed and an associated portion of the uncovered bonding surface is pressed into contact with the depressed area, and where at least another protective sheet of the plurality of protective sheets is subsequently removed and another associated portion of the uncovered bonding surface is then pressed into contact with the tire adjacent the depressed area such that one or more portions of the tire patch overlap the pair of beveled side surfaces.

10. The method of claim 1, wherein the plurality of protective sheets include an intermediate pair of opposing protective sheets arranged between a first adjacent pair of opposing protective sheets and a second adjacent pair of opposing protective sheets, each pair of protective sheets being arranged side-by-side in a direction of the repair patch length, such that the fold of each protective sheet extends in a direction of the repair patch width and such that the folds for each pair of protective sheets are arranged in an abutting arrangement.

11. The method of claim 10, wherein the one or more depression sheets includes the intermediate pair of protective sheets.

12. The method of claim 11, wherein the intermediate pair of protective sheets forms the one or more depression sheets.

13. The method of claim 10, further comprising:

pulling a first intermediate tab associated with a first intermediate protective sheet of the intermediate pair of protective sheets during the step of pulling a first tab;

pressing a first intermediate portion of the bonding surface associated with the first intermediate protective sheet during the step of pressing the associated portion;

pulling a second intermediate tab associated with for a second intermediate protective sheet of the intermediate pair of protective sheets, thereby removing the intermediate pair of protective sheets from the repair patch;

pressing a second intermediate portion of the bonding surface associated with the second intermediate protective sheet, thereby applying the associated second intermediate portion of the repair patch onto the damaged portion of the tire;

pulling each of a first adjacent sheet tab associated with a first adjacent sheet and a second adjacent sheet tab associated with a second adjacent sheet of the first adjacent pair, thereby removing the first adjacent pair of protective sheets from the repair patch;

pressing a first adjacent portion of the bonding surface associated with the first adjacent sheet and the second adjacent sheet, thereby applying an associated first adjacent portion of the repair patch onto the damaged portion of the tire;

pulling each of a third and a fourth adjacent sheet of the second adjacent pair, thereby removing the second adjacent pair of protective sheets from the repair patch; and;

pressing a second adjacent portion of the bonding surface associated with the third adjacent sheet and the fourth adjacent sheet, thereby applying an associated second adjacent portion of the repair patch onto the damaged portion of the tire, where the steps of pulling and pressing for all protective sheets remove air between the repair patch and the damaged portion and prevent bridging of the repair patch.

\* \* \* \* \*